United States Patent [19]

Cotton et al.

[11] Patent Number: 6,059,226
[45] Date of Patent: May 9, 2000

[54] NAVIGATION OF HELICOPTER WITH LIMITED POLAR GROUNDSPEED COMMANDS

[75] Inventors: Bryan S. Cotton, Monroe, Conn.; David M. Walsh, Palm City, Fla.

[73] Assignee: Sikorsky Aircraft Corporation, Stratford, Conn.

[21] Appl. No.: 09/069,319

[22] Filed: Apr. 29, 1998

[51] Int. Cl.[7] .................................................. B64L 27/57
[52] U.S. Cl. ........................ 244/17.13; 701/7; 701/201; 244/175
[58] Field of Search .............................. 244/17.11, 17.13, 244/17.25, 194, 195, 175; 702/144; 701/7, 8, 10, 200, 201

[56] References Cited

U.S. PATENT DOCUMENTS

| | | | |
|---|---|---|---|
| 4,343,035 | 8/1982 | Tanner | 244/175 |
| 5,169,090 | 12/1992 | Wright et al. | 244/175 |
| 5,178,307 | 1/1993 | Wright et al. | 244/17.13 |
| 5,337,244 | 8/1994 | Nobe et al. | 701/200 |
| 5,515,284 | 5/1996 | Abe | 701/200 |
| 5,610,845 | 3/1997 | Slabinski et al. | 702/144 |
| 5,890,101 | 3/1999 | Schaefer et al. | 702/144 |

*Primary Examiner*—Galen L. Barefoot
*Attorney, Agent, or Firm*—M. P. Williams

[57] ABSTRACT

The airspeed limiting performance envelope of a helicopter is converted to a groundspeed envelope by factoring-in the wind speed and direction. A groundspeed command for an unmanned helicopter is provided as a function of the range to the helicopter's destination. The function may be calculated so as to provide a nominal groundspeed command equal to a nominal groundspeed command limit, or the function may be a fixed function to cause the aircraft to creep toward final approach. The cosine and sine of the desired relative flight direction of the aircraft, which is equal to the true bearing to the destination minus the true heading of the aircraft, are utilized to scale the groundspeed command into a longitudinal groundspeed command and a lateral groundspeed command. If one of the groundspeed commands is over a corresponding limit, the other groundspeed command is scaled back so that the vector addition of the two commands will cause flight in the desired direction. Exceedance of either a right or left groundspeed command, as well as saturation of the right or left cyclic pitch channel will cause the aircraft heading to be yawed into the direction of the limit exceedance or channel saturation.

12 Claims, 8 Drawing Sheets

NAVIGATION OF HELICOPTER WITH LIMITED POLAR GROUNDSPEED COMMANDS

TECHNICAL FIELD

This invention relates to automatic navigation of a helicopter, including an unmanned helicopter, utilizing a range related limited groundspeed resolved through polar transformation to longitudinal and lateral velocity commands, utilizing groundspeed limits related to airspeed limits by wind, with scaling of overlimited commands to achieve desired course to a destination, and heading adjustments to overcome excessive lateral (roll) commands due to wind.

BACKGROUND ART

Although rotary wing aircraft can fly in any direction, such aircraft, and particularly unmanned rotary wing aircraft of the type having counterrotating blades and no tail rotor, are most stable when flying in the forward direction, due to a nose-heavy weight distribution which is designed into the aircraft. For improved stability, performance margin and safety, a rotary wing aircraft usually hovers with its heading directly into the wind; this is particularly true for unmanned rotary wing aircraft. If such an aircraft is given a new course which is significantly diverse from its current heading, it could fly directly in that direction regardless of the true heading of the aircraft. However, airspeed limiting, to assure safe operation, may reduce the commanded forward or lateral velocity so that the net course of the aircraft will be determined by vector addition of limited airspeeds, either one or both of which are simply established by the limiters, rather than by the desired course. Thus, any command to cause the rotary wing aircraft to advance from hover to some new destination is very likely to cause it to fly, at least initially, in the wrong direction, due to independent limiting of airspeed in the longitudinal channel and in the lateral channel.

Even if a rotary wing aircraft is yawed from having its heading into the wind during hover so as to cause its heading to be in the direction of a newly-commanded destination, the aircraft could be subjected to strong lateral winds, or a strong tailwind, which are unsafe conditions for rotary wing aircraft, depending on the severity thereof. And, when flying along a course, the wind direction or speed may change, or there may be gusts. The effect of strong winds on a rotary wing aircraft can result in saturated lateral cyclic pitch or aft longitudinal cyclic pitch, as a consequence of limiting to ensure that the aircraft stays within the safe envelope of commands, which assure aircraft stability. At times, if the aircraft is yawed so as to fly sufficiently into the wind to maintain course, it is not capable of staying within lateral cyclic pitch limits and maintaining a direction toward the desired destination.

To limit the complexity and weight of an unmanned rotary wing aircraft, it is convenient to use existing control channels to navigate the aircraft from one position to a new position. Specifically, the hover hold command channel may be utilized to command the aircraft to a new destination by simply introducing a range and bearing as errors into the hover hold system. If hover hold is implemented by means of longitudinal and lateral velocity hold channels, then a speed must be commanded to cause the aircraft to leave its initial hover position and advance to its new destination before resuming hover. If the speed is selected so that the aircraft can decelerate to hover at the new position without overshoot, the selected speed may cause the aircraft to proceed much too slowly from one position to another.

DISCLOSURE OF INVENTION

Objects of the invention include: flying an unmanned rotary wing aircraft from point to point utilizing heading and groundspeed commands calculated to keep the aircraft within a safe flight envelope; flying an unmanned helicopter at distances so far away from an operator that manually piloted flight is impractical; providing speed control that allows flight from one point to another in a reasonable time, while not overshooting the final destination; elimination of flight in a wrong direction due to independent limiting of longitudinal and lateral channels in a helicopter; providing lateral and longitudinal commands to a helicopter which will fly a helicopter toward a destination, without regard to its heading; providing instantaneous longitudinal or lateral command adjustments as well as long-term heading adjustments to overcome misdirected flight caused by commands above the corresponding command limits; controlling deceleration of a helicopter at a destination and transition to hover with heading into the wind; accurate navigation of an unmanned helicopter utilizing groundspeed commands and limits.

According to the present invention, longitudinal (pitch) and lateral (roll) velocity hold channels are utilized to navigate an unmanned helicopter from one point to a destination remote therefrom. According to the invention, longitudinal and lateral airspeed limits are converted by wind speed and direction into longitudinal and lateral groundspeed limits. According to the invention, separate longitudinal and lateral groundspeed commands are computed from the cosine and sine of aircraft direction (relative angle of course to destination), respectively. According to the invention, the longitudinal and lateral groundspeed commands are separately limited utilizing longitudinal and lateral groundspeed limits. According to the invention, longitudinal or lateral groundspeed commands that are above limit cause the other (lateral or longitudinal) groundspeed command to be scaled proportionately so as to maintain desired course. According to the invention, if either right or left lateral groundspeed command is limited by a groundspeed limit, the heading of the aircraft is adjusted to allow the aircraft to remain on course with lateral speed at the lateral limit. According to the invention, the groundspeed command is generated as a limited function of a calculated constant, the constant being in turn an adjustable function of a forward groundspeed limit of the helicopter. According to the invention, final approach is defined when the range-dependent groundspeed command reaches a final approach limit, after which commanded groundspeed is a limited function of a fixed constant. According to the invention, reaching a position of hover with the helicopter heading into the wind is achieved by commanding the heading to point into the wind, at a point approaching the destination determined by recognizing a commanded groundspeed which is a selectable fraction of a final approach groundspeed limit.

The present invention may be implemented with analog circuitry, and in fact is described in functional block form, but the invention is preferably implemented in a suitably programmed flight control computer, having functional capability similar to any suitable popular personal computer, utilizing mathematical algorithms and other subroutines which are well known in the art.

Other objects, features and advantages of the present invention will become more apparent in the light of the following detailed description of exemplary embodiments thereof, as illustrated in the accompanying drawing.

BEST MODE FOR CARRYING OUT THE INVENTION

The present invention is described as it would apply to an unmanned aerial vehicle of the type generally referred to in commonly owned U.S. Pat. Nos. 5,058,824, 5,150,857, 5,429,089, 5,552,983, and 5,676,334, all of which are incorporated herein by reference. That vehicle is generally toroidal in shape, having counterrotating, variable-pitch blade rotors, coaxially driven within the center of the toroid.

Figure 4A:
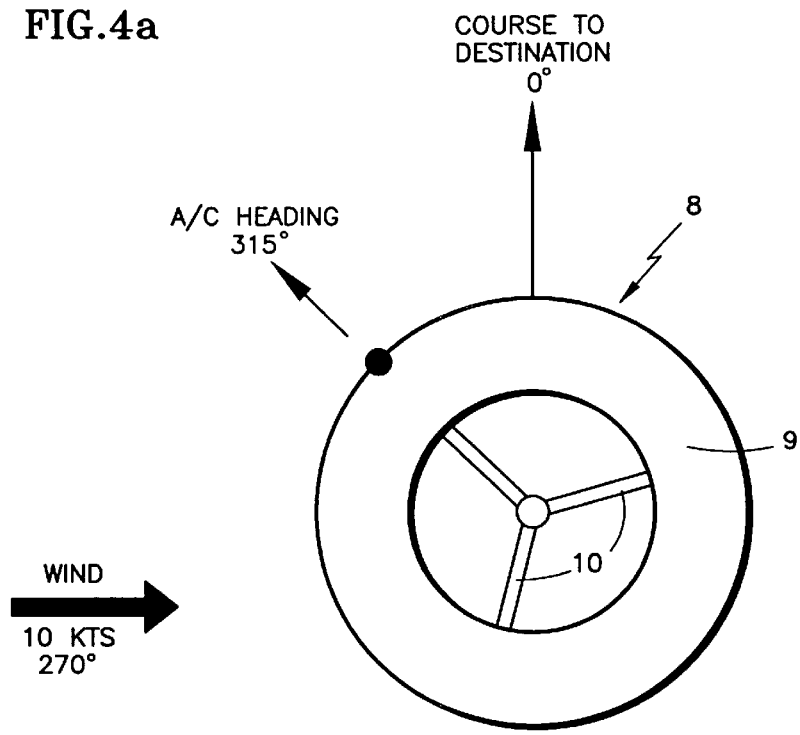
FIGS. 4a and 4b are related diagrams illustrating the need for, and the manner of provision of, scaling to accommodate speed command limits, according to the present invention.

Referring to FIG. 4a, the invention herein is described as it might apply to an exemplary vehicle, such as an unmanned helicopter 8 having a generally toroidal fuselage 9 which also comprises the shroud for the counterrotating rotor blades 10.

Figure 1:
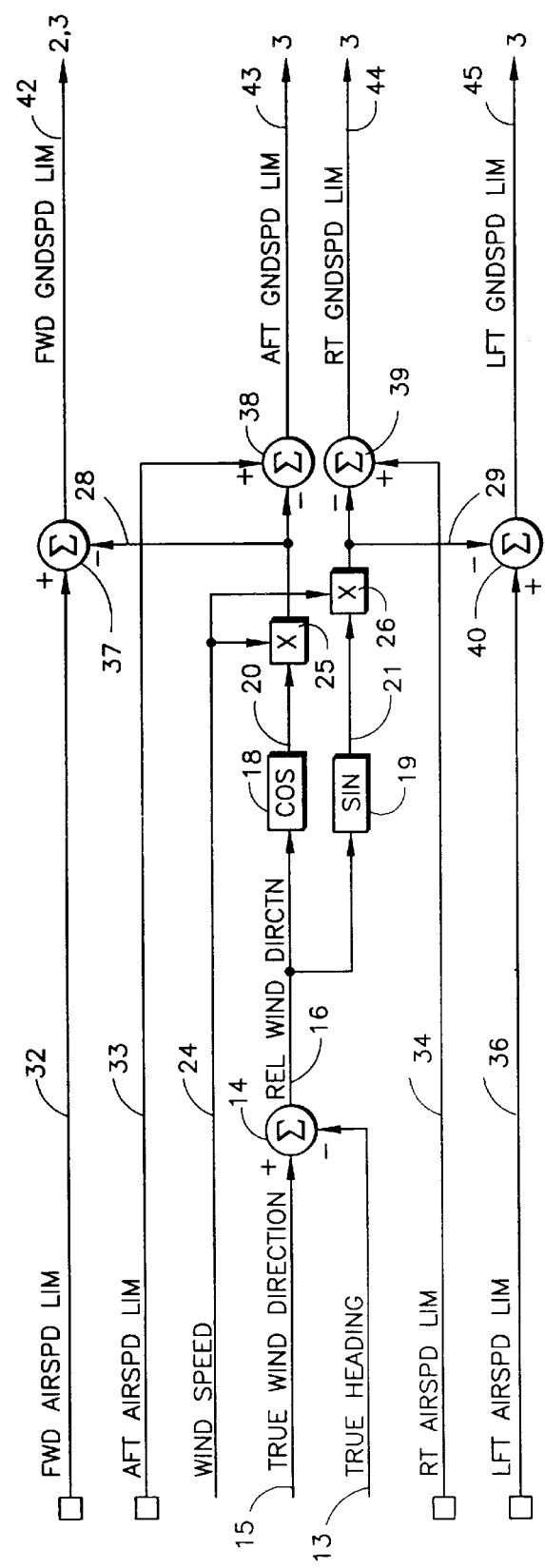
FIG. 1 is a functional block diagram of the provision of groundspeed limits, according to the present invention.

Referring to FIG. 1, one aspect of the present invention is converting the fixed airspeed performance envelope limits to groundspeed limits, by taking into account wind speed and direction. In FIG. 1, the true heading of the aircraft on a line 13 is subtracted in a summer 14 from true wind direction on a line 15 to provide relative wind direction on a line 16. A cosine function 18 and a sine function 19 respectively provide the cosine and sine of the relative wind direction on corresponding lines 20, 21, which are used to scale the wind speed on a line 24 in corresponding multipliers 25, 26. Thus, the multiplier 25 provides a longitudinal wind speed value on a line 28 and the multiplier 26 provides a lateral wind speed value on a line 29. The values on the lines 28 and 29 may either be positive (forward and right) or negative (aft and left). Whatever the wind components are, they are subtracted from the forward airspeed limit on a line 32, the aft airspeed on the line 33, the right airspeed limit on the line 34 and the left airspeed limit on a line 36 in corresponding summers 37–40. The summers thereby provide a forward groundspeed limit on a line 42, an aft groundspeed limit on a line 43, a right groundspeed limit on a line 44, and a left groundspeed limit on a line 45. These are utilized to limit the groundspeed commands, as described more fully with respect to FIG. 3.

Figure 2:
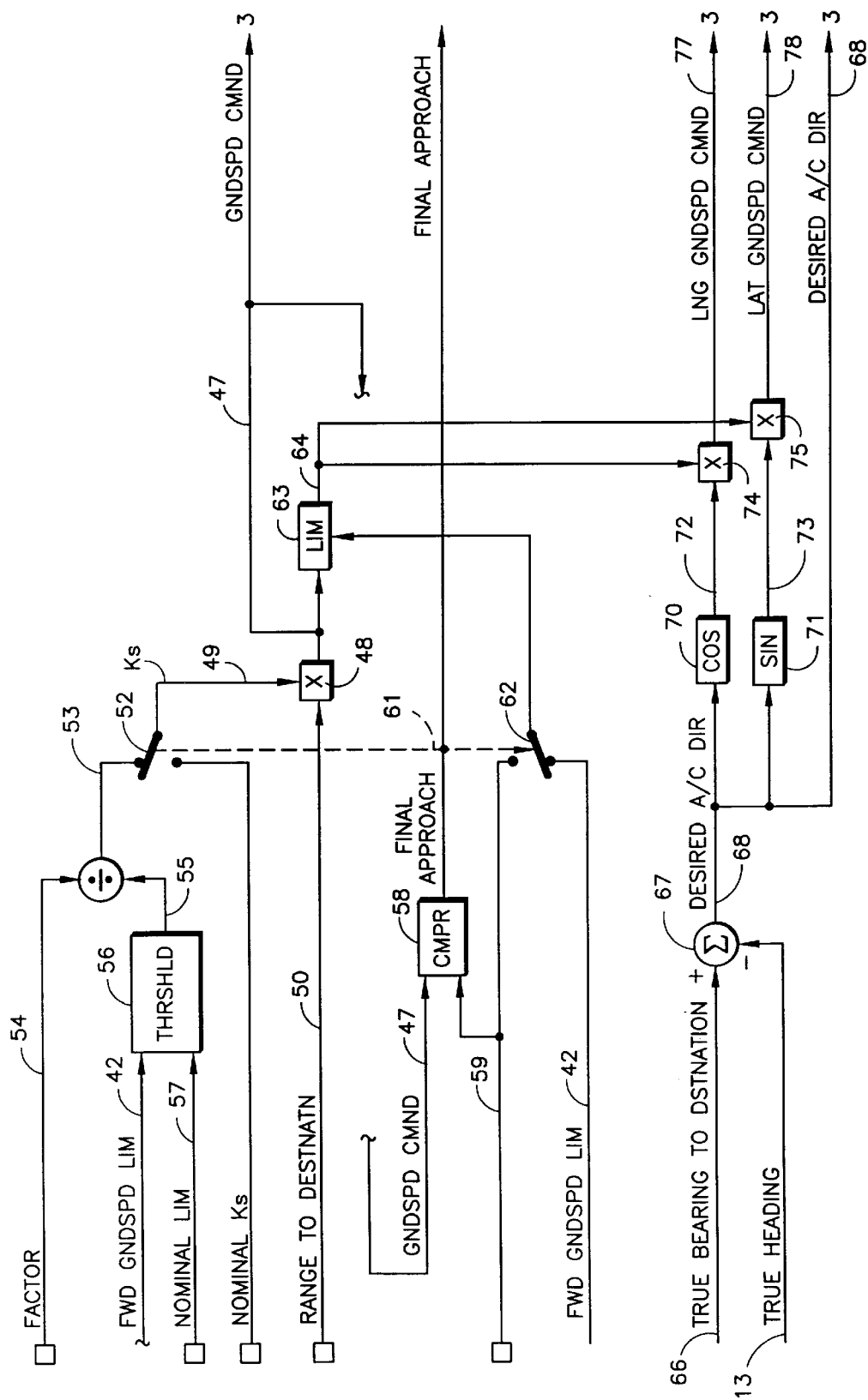
FIG. 2 is a functional block diagram of the provision of longitudinal and lateral groundspeed commands, according to the present invention.

In FIG. 2, a groundspeed command on a line 47 is provided by a multiplier 48 as a constant, Ks, on a line 49 times the range to destination (the distance between the aircraft's present position and its ultimate destination) on a line 50. The groundspeed command on the line 47, being a function of the range to destination, will be extremely high when the aircraft is a long way from its destination, but it is limited as described in FIG. 3. The speed constant Ks on line 49 is provided through a switch 52 which is in the position shown in FIG. 2 during the initial portion of a flight to a destination and until reaching the final approach of the destination. In such case, the constant, Ks, is not a true constant, but is calculated on a line 53 as the ratio of a fixed factor (indicative of how fast, in general, it is desired for the aircraft to fly) on a line 54 divided by a limit signal on a line 55, which is such as will provide a forward groundspeed under current wind conditions which is at the forward groundspeed limit on the line 42, as generated in FIG. 1. However, in the case of extremely high head winds, the forward groundspeed limit could be so low that the generated groundspeed command would be unsuitably high; to prevent that, a threshold function 56 substitutes a nominal limit on a line 57 for the forward groundspeed limit on the line 42 in the event that the forward groundspeed limit on line 42 falls below the nominal limit on the line 57. This assures that the calculated Ks will not become larger than the nominal Ks, which could impact hover stability near the destination.

The groundspeed command on the line 47 is compared in a comparator 58 with a final approach groundspeed limit on a line 59. When the range to destination on the line 50 becomes sufficiently small, the groundspeed command on line 47 is reduced to the final approach groundspeed limit on the line 59, and a final approach output 61 is generated, which causes the switch 52 to transfer from the position shown in FIG. 2 to the other position. This causes a nominal speed constant, Ks, to be provided through the switch 52 to the multiplier 48 so as to ensure that there will be sufficient speed to actually reach the destination in a timely fashion, even as the range reduces toward zero. In other words, it ensures a final creep speed that is adequate. The final approach output 61 also transfers another switch 62 from the position shown in FIG. 2 in which the forward groundspeed limit on the line 42 is applied to a limiter 63 so that on final approach, a fixed final approach limit on the line 61 is applied to the limiter 63. The limiter 63 causes the groundspeed command on line 47 to be applied as a limited groundspeed command on a line 64 which ranges between zero feet per second and either the forward groundspeed limit on line 42 during cruise toward the destination, or the final approach groundspeed limit on 59, during final approach.

Another feature of the present invention, illustrated in FIG. 2, helps to prevent heading offsets as a function of limits applied to longitudinal and lateral components of airspeed. Therein, the true heading of the aircraft on the line 13 is subtracted from the true bearing to the destination on a line 66 in a summer 67, to determine the desired aircraft direction on a line 68, which represents the relative bearing to the destination. This is applied to cosine and sine functions 70, 71 so as to respectively provide the cosine and sine of the relative bearing to the destination on corresponding lines 72, 73. These signals are used in multipliers 74, 75 to scale the limited groundspeed command on the line 64 appropriately to provide a longitudinal groundspeed command on a line 77 and a lateral groundspeed command on a line 78. Thus, instead of each channel, longitudinal and lateral, receiving the full groundspeed command, the groundspeed command is scaled to provide longitudinal and lateral commands which are directly related to the desired aircraft direction, that is, directly related to the relative bearing to the destination.

Figure 3:
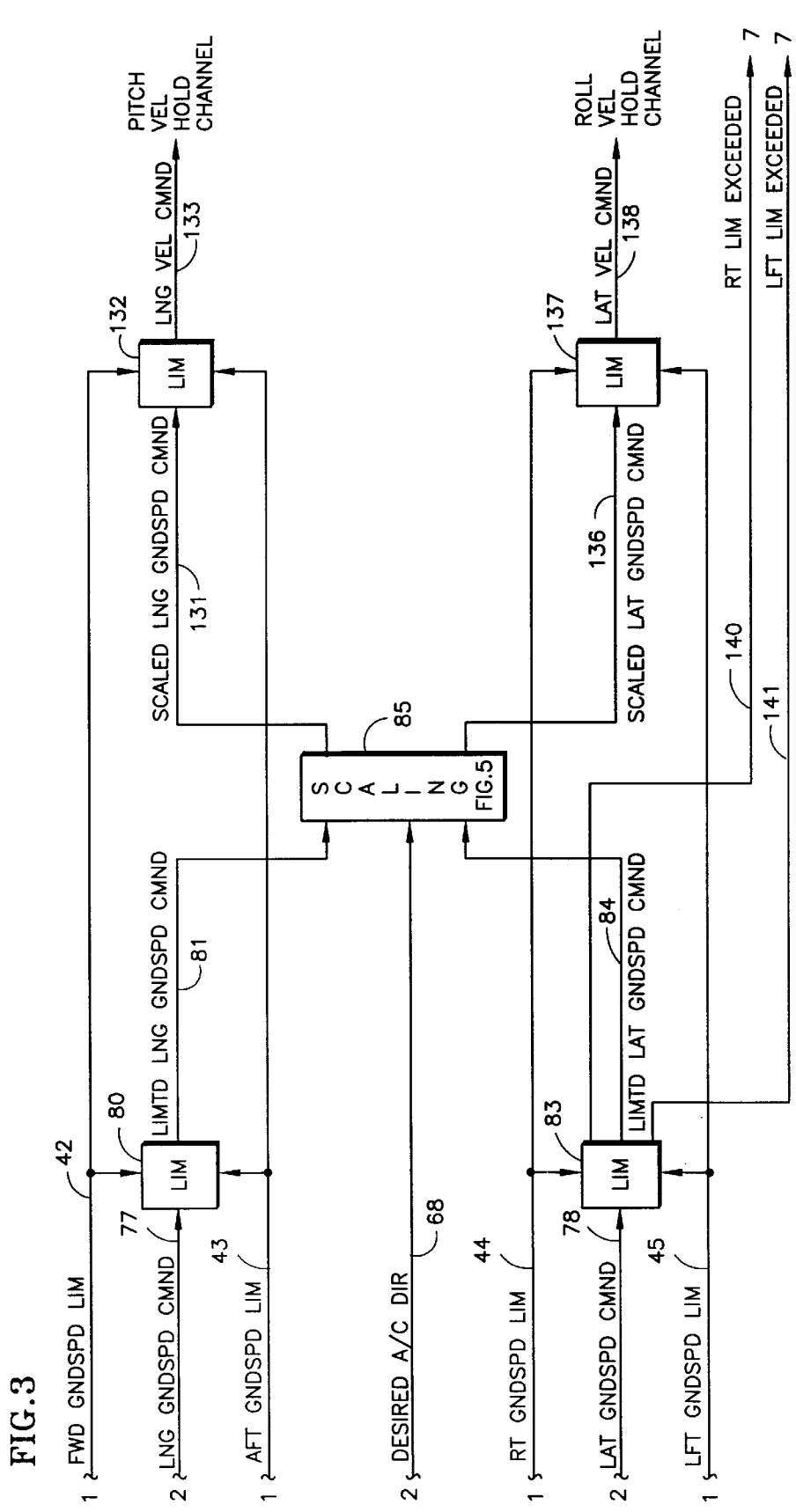
FIG. 3 is a functional block diagram of the provision of scaled and limited longitudinal and lateral velocity commands, according to the present invention.

In FIG. 3, the longitudinal groundspeed command on line 77 is limited in a limiter 80 so as to provide a limited longitudinal groundspeed command on a line 81 which is between the forward groundspeed limit on the line 42 and the aft groundspeed limit on the line 43. Similarly, the lateral groundspeed command on line 78 is limited in a limiter 83 so as to provide a limited lateral groundspeed command on a line 84 which is between the right groundspeed limit on the line 44 and the left groundspeed limit on the line 45. The limited groundspeed commands on lines 81 and 84 are applied to a scaling function 85, the details of which are described with respect to FIGS. 4 and 5.

Figure 4B:
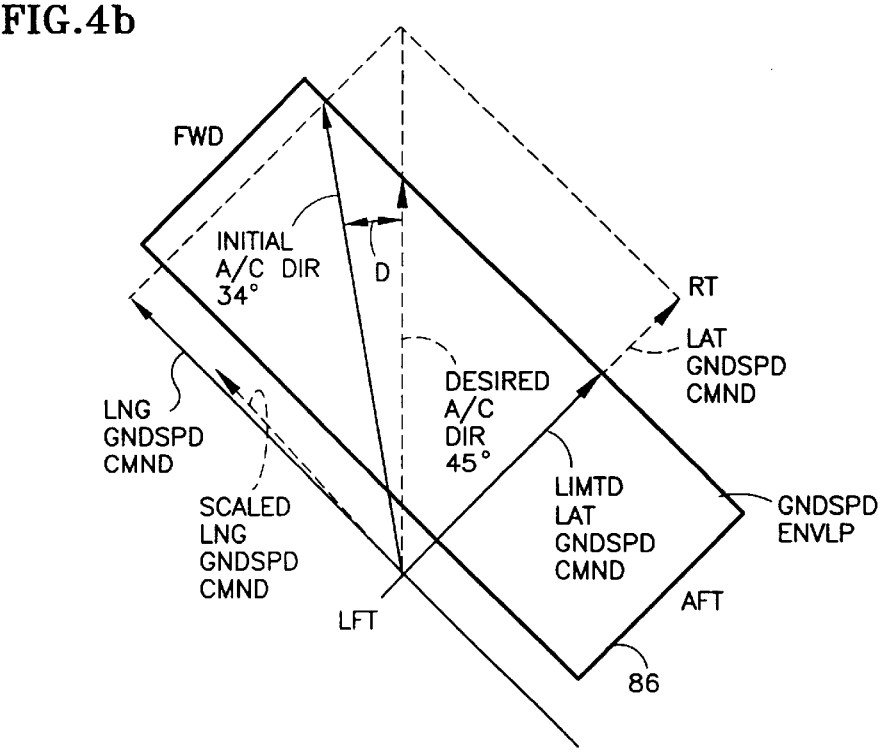

Referring to FIG. 4a, the unmanned helicopter 8 is shown with a heading of 315° in a 270° wind of 10 knots and having a course to destination which is 0° (North). With the aircraft heading at 315° and the course to destination at 0°, the aircraft has to fly in a 45° direction; that is, the relative course to the destination is 45°. This is depicted in FIG. 4b. As an example, consider an initial limited groundspeed command on line 64 (FIG. 2) of 25 knots. The 25 knots will be resolved by the multipliers 74, 75 (FIG. 2) into a longitudinal groundspeed command of +17.7 knots (forward) on the line 77 and a lateral groundspeed command on the line 78 of +17.7 knots (to the right). In FIG. 4b, assume that the groundspeed envelope 86 resulting from the fixed airspeed envelope and the effect of the wind (FIG. 4a) provides a forward limit of +17.9 knots and a right limit of 12.1 knots. The forward command of +17.7 knots is not further limited by the envelope 87, but the lateral command of +17.7 knots is limited to 12.1 knots in the limiter 83 (FIG. 3). By vector addition, it is seen that the initial course of the aircraft is +34° relative, to the left of the desired, northerly course. In order to get the aircraft to fly in the desired aircraft direction (45°), the longitudinal groundspeed command is scaled back so that by vector addition of the scaled longitudinal groundspeed command with the limited lateral groundspeed command, the course will be due north, which is 45° relative to the aircraft.

Figure 5:
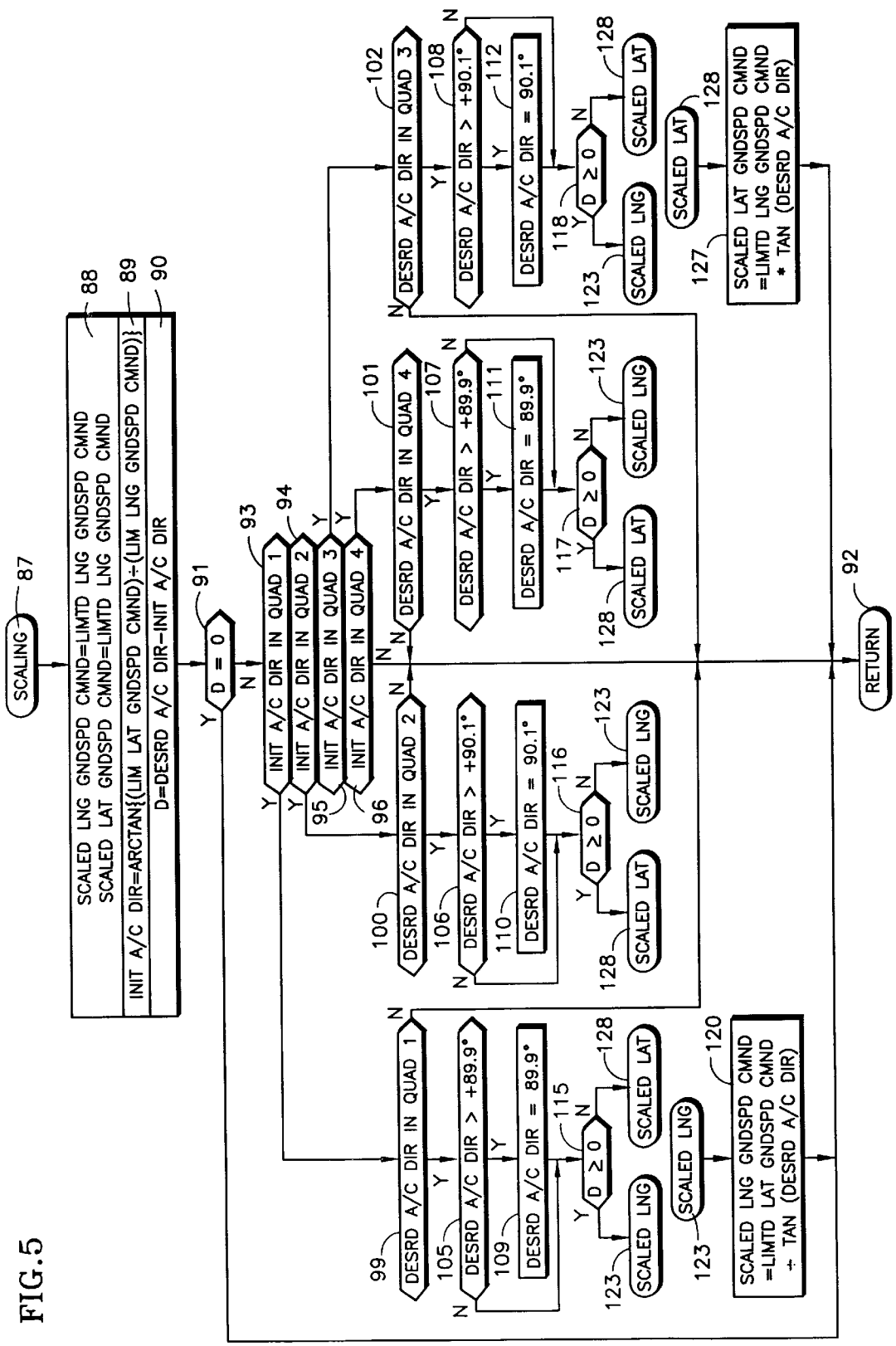
FIG. 5 is a logic flow diagram illustrating a routine to perform scaling, in accordance with the present invention.

In FIG. 5, a scaling routine 85 is reached through an entry point 87 and a first pair of steps 88 set scaled longitudinal and lateral groundspeed (lines 131 and 136) equal to limited longitudinal and lateral groundspeed (lines 81 and 84), respectively. One of these may be changed (scaled back) by this routine, if appropriate, as follows. Then a step 89 determines the initial aircraft direction (as seen in FIG. 4b) as the arctangent of the limited lateral groundspeed command on line 84 (FIG. 3) divided by the limited longitudinal groundspeed command on line 81. In the third and fourth quadrants, negative angles between 0 and 180° are used. Then, in a step 90, a direction difference angle, D, is determined as the desired aircraft direction minus the initial aircraft direction. If, as in FIG. 4b, the desired and initial aircraft directions are both in the first quadrant of the aircraft, that is, between 0° and 90° relative, and if the direction difference angle, D, is positive (that is, the desired angle is greater than the initial angle), then the longitudinal groundspeed command must be scaled back to provide, by vector summation with the limited lateral groundspeed command, a groundspeed which is in the desired aircraft direction. On the other hand, if the aircraft were flying more laterally than desired, then the difference between the two angles would be negative, and so the lateral groundspeed command would be scaled back to suit a limited longitudinal groundspeed command. In quadrants other than the first quadrant. similar relationships exist. If both the initial and desired aircraft directions are in the third quadrant, the situation will be the same as in the first quadrant: a positive result of subtracting the initial aircraft direction from the desired aircraft direction will cause the longitudinal groundspeed command to be scaled back to suit a limited lateral groundspeed command. In quadrants 2 and 4, the longitudinal groundspeed command is scaled back when D is negative.

In FIG. 5, a test 91 determines if D equals zero. If it does, this means that the initial aircraft direction is the same as the desired aircraft direction so that no scaling is required. Therefore, an affirmative result of test 91 will cause the routine to end and other programming to be reached through a return point 93. If D is nonzero, a plurality of tests 93–96 determine which quadrant the initial aircraft direction is in; this can be achieved simply by comparing the numerical value of the angle, in degrees or radians, with quadrant limits. Then a series of tests 99–102 determine if the desired aircraft direction is also in the same quadrant with the initial aircraft direction. In each instance, if the initial aircraft direction is not in the same quadrant with the desired aircraft direction, then a negative result of any one of the tests 99–102 will cause the routine to end and other programming to be reached through the return point 93. If the initial aircraft direction is in the same quadrant as the desired aircraft direction, an affirmative result of one of the tests 99–102 will reach a corresponding test 105–108 to determine if the desired aircraft direction exceeds either plus or minus 89.9°, depending upon its quadrant. Because the tangent of 90° is infinity (and tangent 89.9 is very high), the desired aircraft direction of near plus or minus 90°, is altered in corresponding steps 109–112 to either be a tenth of a degree lower or higher, as the case may be. If the desired aircraft direction does not exceed plus or minus 89.9°, the corresponding step 109–112 is bypassed by a negative result of one of the steps 105–108. Then, it is determined in a related test 115–118 whether the direction difference angle D is positive or not. As seen in FIG. 4b, if D is positive in the first quadrant, the longitudinal groundspeed command must be scaled to suit the limited lateral command. If the opposite is true in the first quadrant, then the lateral command must be scaled. This is achieved by an affirmative result of either of the tests 115 or 118 reaching a step 120 through a scale longitudinal transfer point 123. On the other hand, a negative result of test 115 or 118 will cause a step 127 to be reached through a scale lateral transfer point 128. Similar but opposite results are obtained from the tests 116 and 117 in the second and fourth quadrants.

When the longitudinal groundspeed command is to be scaled, the step 120 generates a scaled longitudinal groundspeed command which is equal to the limited lateral groundspeed command divided by the tangent of the desired aircraft direction. The scaled lateral groundspeed command in this instance remains set equal to the limited lateral groundspeed command (from step 88). If the lateral groundspeed command is to be scaled in order to suit the limited longitudinal groundspeed command, a step 127 generates a scaled lateral groundpseed command as the product of the limited longitudinal groundspeed command times the tangent of the desired aircraft direction, while a step 126 leaves the scaled longitudinal groundspeed command equal to the limited longitudinal groundspeed command (from step 88). In any case where the initial aircraft direction is not in the same quadrant with the desired aircraft direction, scaling cannot be used to achieve the desired aircraft direction. Instead, the desired aircraft direction will be achieved by trimming the heading command as described with respect to FIGS. 6 and 7.

Referring to FIG. 3, the scaled longitudinal groundspeed command on a line 131 is limited in a limiter 132 so as to provide a longitudinal velocity command on a line 133 which is between the forward groundspeed limit on the line 42 and the aft groundspeed limit on the line 43. The scaled lateral groundspeed command on a line 136 is passed through a limiter 137 so as to provide a lateral velocity command on a line 138 which is between the right groundspeed limit on the line 44 and the left groundspeed limit on the line 45. The limiters 132, 137 need not be used if not wanted; they simply provide extra assurance that the scaled commands will not be out of limits. The commands on the lines 133 and 138 are respectively applied to the pitch velocity hold channel and to the roll velocity hold channel to control the related channel in a conventional way.

In the event that the lateral groundspeed command on the line 78 is out of limits, the limiter 83 will provide either a right limit exceeded signal on a line 140 or a left limit exceeded signal on a line 41, as appropriate. These signals are utilized by yaw crab logic described in FIGS. 6 and 7 hereinafter to cause the heading of the aircraft to be turned toward the over-limit side, so as to bring the lateral speed command back into limits.

Figure 6:
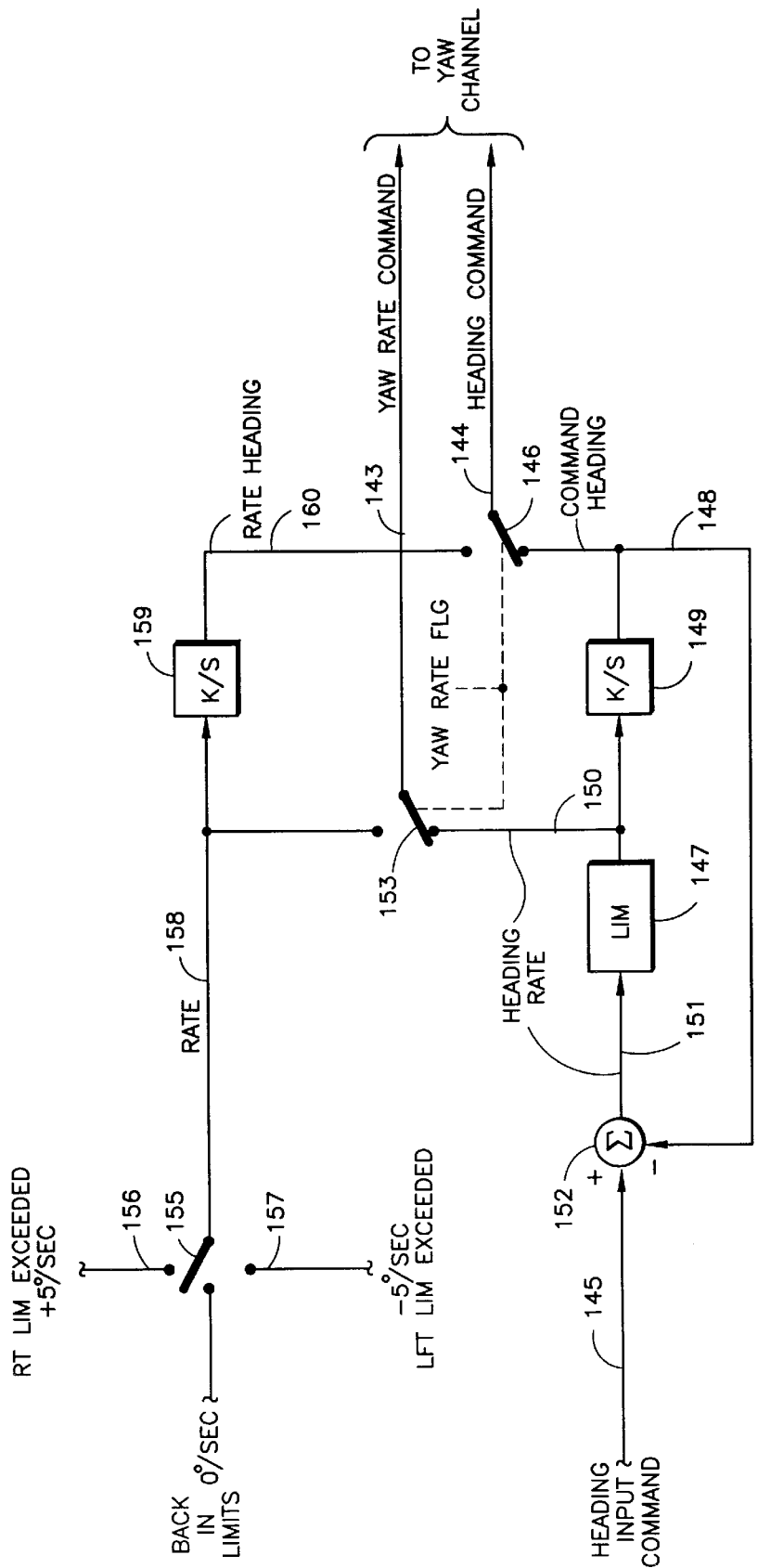
FIG. 6 is a conceptual diagram illustrating heading bias to accommodate lateral command limit exceedances and cyclic channel saturation.

Referring to FIG. 6, a yaw rate command on a line 143 and a heading command on a line 144 are normally provided to the yaw channel in response to a heading input command on a line 145, which may either be a bearing to a destination when cruising to a new destination, or the wind direction when hovering into the wind. With a switch 146 in the position shown, the heading command on line 144 comprises a command heading on a line 148 which is provided by an integrator 149 from a heading rate on a line 150 that is limited function by a limiter 147 of a heading rate on a line 151. The heading rate on line 151 is in turn provided by a summer 152 as the difference between the heading input command on line 145 and the command heading on line 148. The heading rate on line 150 passes through a switch 153, that is ganged with the switch 146, to provide the yaw rate command on the line 143 when the switches are in the position shown. Thus, in normal operation, when a new heading input command is provided, the heading rate on the line 151 will be whatever the heading input command is, and this is limited so as to provide a reasonable rate on the line 150, to cause the yaw channel to yaw toward the new heading, and this heading rate is integrated; when the output of the integrator 149 on the line 148 equals the heading input command, then the heading rate on lines 151 and 150 go to zero so the yaw rate command on line 143 goes to zero, and the heading command on line 144 remains constant until there is a change in the heading input command on the line 145.

The heading can be altered to cause the aircraft to crab, so that high crosswinds will not cause the aircraft to be flying on either of the lateral limits. If either of the right or left limits are exceeded, as indicated by signals on one of the lines 140, 141 in FIG. 3, then a switch 155 will appropriately select either a +5° per second yaw rate on a line 156 or a –5° per second yaw rate on a line 157. Such an exceedance will also cause a yaw rate flag to switch the switches 146, 153 from the position shown in FIG. 6 to the other position. As a result, the yaw rate command on line 143 will become the rate on a line 158 as determined by the position of the switch 155. This rate is applied to an integrator 159, the output of which is a rate heading on a line 160 which passes through the switch 146 to become the heading command on the line 144. Once a limit is exceeded during a particular navigation leg, the yaw rate flag will remain set even after the right or left limit is no longer being exceeded. When the rate heading has integrated to such a point that the limit exceeded signal on line 140 or 141 disappears, the switch 155 will assume the central position and command a rate of 0° per second so that the output of the integrator 159 remains constant, and the yaw rate command on the line 143 goes to zero. The aircraft will fly in this state until it reaches final approach, at which time the yaw rate flag is reset and the switches 146, 153 will resume the position shown in FIG. 6. The integrators 149, 159 are initialized prior to each use at the current true heading of the aircraft.

Figure 7:
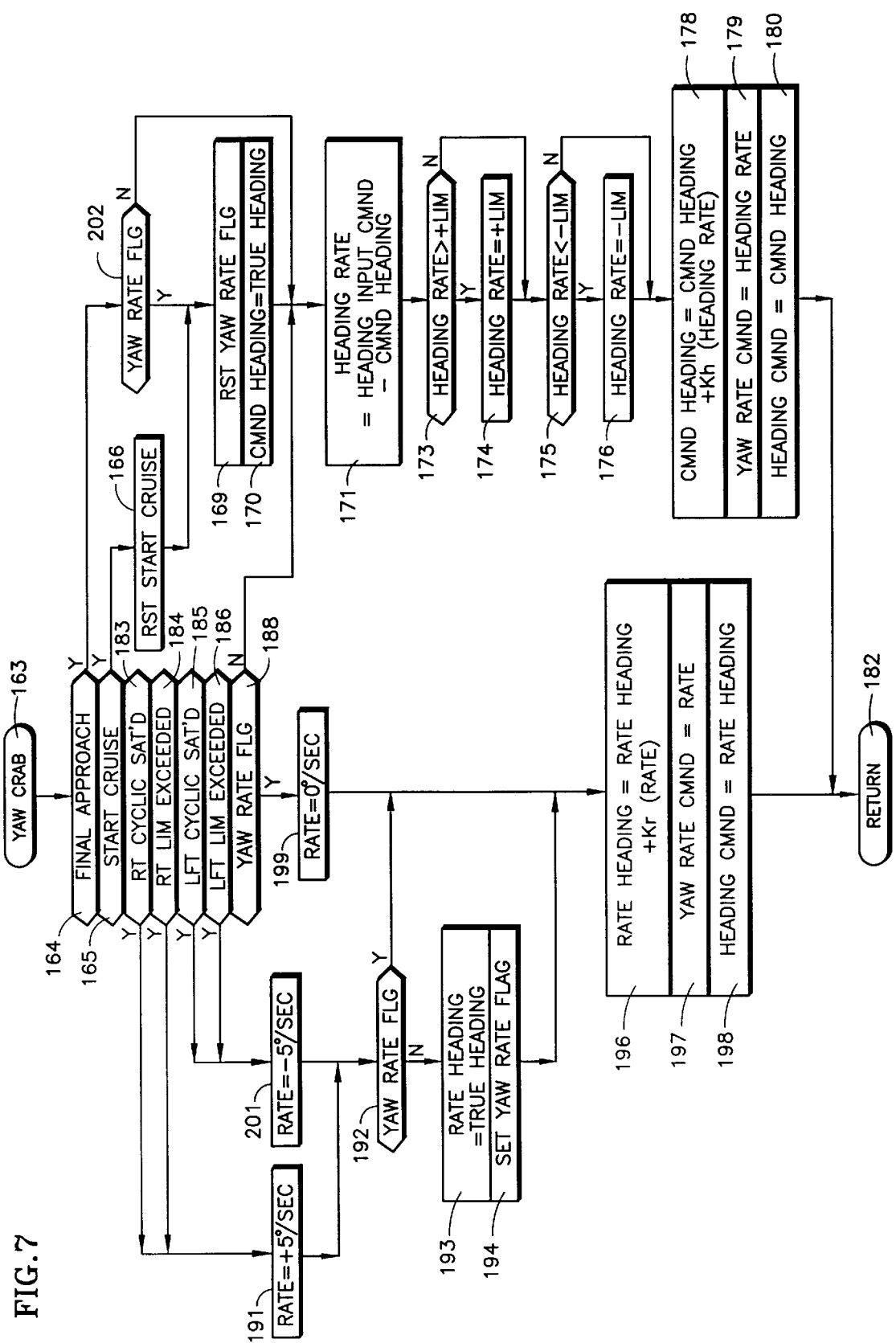
FIG. 7 is a logic flow diagram illustrating a routine to perform the functions described with respect to FIG. 6.

A yaw crab routine for performing the functions described with respect to FIG. 6 is reached in FIG. 7 through an entry point 163. A first test 164 determines if the aircraft has reached final approach in a navigation leg from one point to a new destination. Initially, assume that such is not the case. A negative result of test 164 reaches a test 165 to determine if the start of cruise along a navigation leg exists. If so, an affirmative result of test 165 reaches a step 166 to reset a flag indicating that fact so that in a subsequent pass through the routine of FIG. 7, test 165 will be negative. Then, a step 169 resets the yaw rate flag and the command heading integrator 149 is initialized at the aircraft true heading in a step 170. A step 171 performs the function of the summer 152 (FIG. 3), subtracting the command heading from the heading input command so as to provide the heading rate. Then, a series of steps and tests 173–176 perform the function of the limiter 147. A step 178 performs the function of the integrator 149 to provide the command heading signal on line 148 of FIG. 6. And since the yaw rate flag is reset, a step 179 provides the yaw rate command as the heading rate and a step 180 provides the heading command as the command heading. Then, other programming is reverted to, through a return point 182.

The routine of FIG. 7 will be reached periodically, which may be on the order of every 80 milliseconds or so. In a next pass through the routine of FIG. 7, test 164 is assumed to be negative, step 165 will be negative, and a series of tests 183–186 determine if either the right or left cyclic pitch channel is saturated, or if either a right or left limit exceeded signals on lines 140, 141 of FIG. 3 is present. Assume that all of these tests are negative, the test 188 determines if the yaw rate flag is set or not. Since it was reset in step 169, a negative result of test 188 will reach the steps and tests 171–180 once again. Operation will continue in this manner unless either the roll channel is saturated or the lateral groundspeed command exceeds a limit.

Assume that in the next pass through the routine of FIG. 7, the right limit exceeded signal on line 140 of FIG. 3 is present, as in FIG. 4b. This causes an affirmative result of test 184 to reach a step 191 which sets the rate (line 158 of FIG. 6) equal to plus 50 per second. Then a test 192 determines if the yaw rate flag has been set or not. Initially it will not have been, so a negative result of test 192 reaches a step 193 which initializes the rate heading integrator 159 (FIG. 6) at the true heading of the aircraft, after which a step 194 sets the yaw rate flag. Then, a step 196 performs the function of the rate heading integrator 159 by adding the rate on line 158 scaled by a constant Kr to the rate heading, so as to provide the integrated rate heading on line 160 of FIG. 6. Then, since the switches 146 and 153 are transferred with the yaw rate flag, a step 197 sets the yaw rate command on line 143 equal to the rate on line 158 and a step 198 sets the heading command on the line 144 equal to the rate heading on the line 160. Then other programming is reached through the return point 182.

In the next pass through the routine of FIG. 7, it is likely that the right groundspeed limit is still exceeded, so that test 184 will again be affirmative, passing through the step 191 which redundantly sets the rate equal to +5° per second, and then reaching the test 192. This time, test 192 is affirmative, so that the rate heading integrator 159 is not initialized again. But then the step 196 integrates the rate and the steps 197 and 198 provide the outputs to the yaw channel as before.

Assume that the steps 196–198 eventually cause the heading to be such that the yaw of the aircraft is sufficient so that the right groundspeed limit is no longer being exceeded. A negative result of test 184 will pass through negative results of tests 185, 186 and reach the test 188. This time, test 188 is affirmative, reaching a step 199 which sets the rate on line 158 equal to 0° per second. Throughout the remainder of this navigational leg of flight, the yaw rate flag will remain set and unless another exceedance occurs, the rate will continuously be reinforced as 0° per second, and the yaw rate command and heading rate command will continue to be provided as the rate (0° per second) and the integrated rate from the lines 158 and 160 as described hereinbefore.

This will continue until final approach is reached in which case, during a subsequent pass through the routine of FIG. 7, test 164 will be affirmative reaching a test 202 which determines if the yaw rate flag is set. In this first pass since reaching final approach, if there had been a rate limit exceedance during this navigational leg of flight, the result of test 202 will be affirmative reaching the step 169 to reset the yaw rate flag and a step 170 to initialize the command heading integrator 149 at the current true heading of the aircraft. If there had not been any lateral exceedance, the steps 169 and 170 are bypassed. Then, generating the heading rate in step 171, limiting in steps and tests 173–176, integrating in step 178 and providing the outputs in step 179 and 180 will be performed in response to the heading input command, as described hereinbefore. Typically, if the destination to which a final approach is being made is a way point, a new heading input command for another navigational leg may be inputed, and the process repeated as described hereinbefore. On the other hand, if this is the ultimate destination, the heading input command will become the wind direction so that the aircraft will yaw into the wind and hover with that heading.

The description of FIG. 7 thus far assumed a right groundspeed limit exceedance. Exactly the same result can be reached if the right cyclic pitch channel becomes saturated which will cause an affirmative result of test 184. Similarly, if a left groundspeed limit is exceeded, or if the left cyclic pitch channel is saturated, an affirmative result of either test 185 or 186 will cause operation as described hereinbefore except that a step 201 will set the rate on the line 158 equal to −5° per second.

Figure 8:
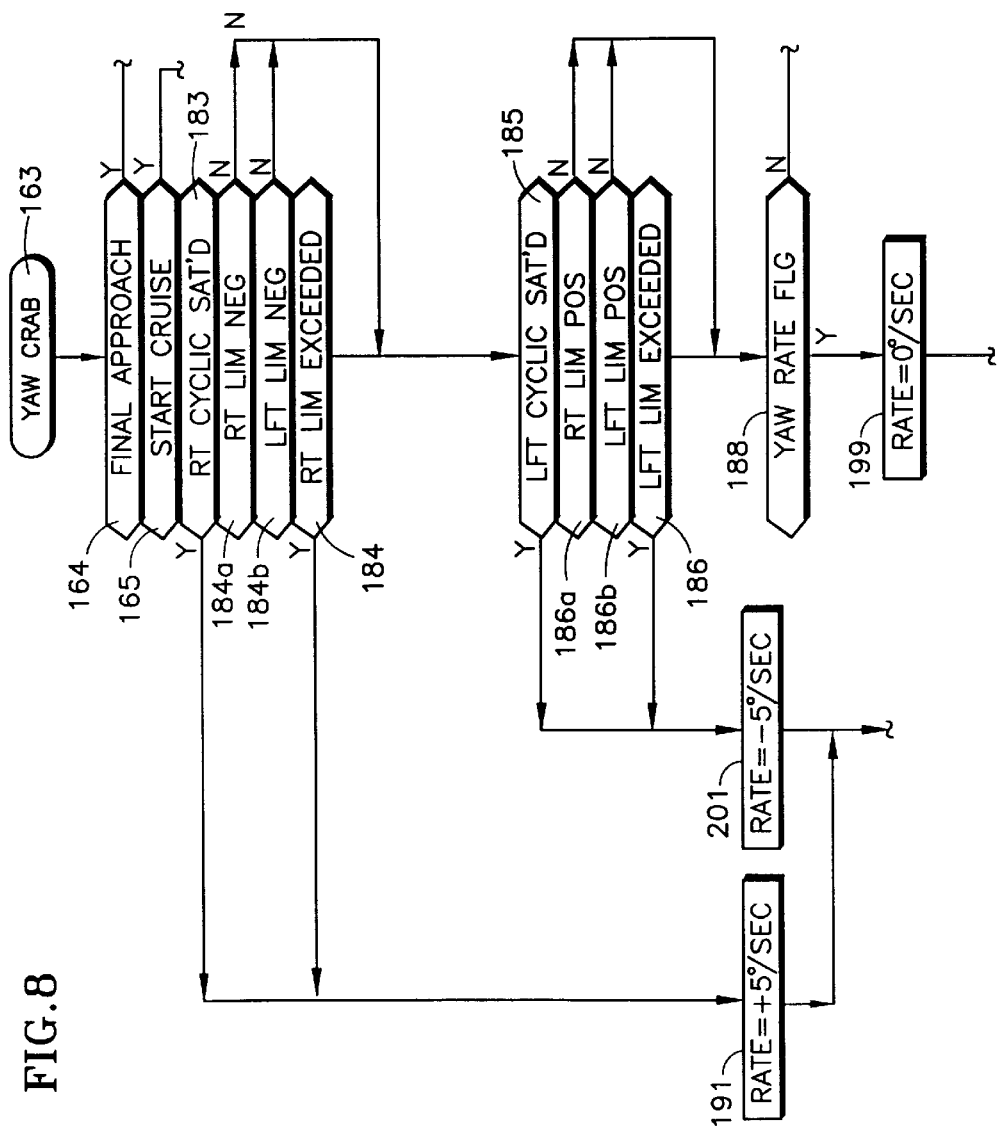
FIG. 8 is a partial logic flow diagram illustrating an alternative to the embodiment of FIG. 7.

The embodiment of FIG. 7 will work in all cases, but there are some cases where crabbing of the aircraft is not required, and so a heading adjustment need not be made simply as a result of one of the lateral groundspeed commands being at a lateral groundspeed command limit. Crabbing is only required when the wind is so strong in a lateral direction that the aircraft cannot maintain course unless it is crabbed so as to head somewhat into the wind. This condition exists when the wind has caused shifting of the groundspeed limits so that both the left and right lateral groundspeed limits are positive (that is, to the right) and the aircraft left limit has been exceeded, meaning it is trying to fly to the left but it can only fly to the right. Conversely, if both the right and left limits are negative and the helicopter is on the right lateral groundspeed limit, it is trying to fly to the right but it can only fly to the left. In an embodiment which may be preferred in some instances, crabbing of the helicopter in response to a lateral groundspeed command exceeding a lateral groundspeed limit is permitted only if both of the groundspeed limits are on the opposite side of the helicopter from the groundspeed limit exceedance. In FIG. 8, additional tests 184*a*, 184*b* are utilized to bypass the test 184 to determine if the right limit is exceeded unless both the right and left limits are negative. Similarly, additional tests 186*a*, 186*b* are utilized to bypass the test 186 which determines if the left limit is exceeded unless both the right and left limits are positive. The remainder of this embodiment is identical to that shown in FIG. 7 and is not described further.

The foregoing has been described as it may be implemented in an unmanned helicopter; however, all of the features of the invention may be utilized in a piloted helicopter, in an automatic flight control (such as an auto pilot).

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. Apparatus for providing a groundspeed envelope for a helicopter, comprising:

means providing a true wind direction signal indicative of the direction of wind in the environment of the helicopter;

means providing a true heading signal indicative of the true heading of the helicopter;

means providing a wind speed signal indicative of the speed of the wind in the environment of the helicopter; and means for providing a relative wind direction signal as the difference between said true wind direction signal and said true heading signal, for providing a longitudinal wind speed signal as the wind speed signal multiplied by the cosine of said relative wind direction signal, for providing a lateral wind speed signal as the product of said wind speed signal and the sine of said relative wind direction signal, for providing a forward airspeed limit signal, an aft airspeed limit signal, a right airspeed limit signal, and a left airspeed limit signal, said limit signals being indicative of the airspeed safety envelope of the helicopter, for providing a forward groundspeed limit signal as a summation of said longitudinal wind speed signal and said forward airspeed limit signal, for providing an aft groundspeed limit signal as a summation of said longitudinal wind speed signal and said aft airspeed limit signal, for providing a right groundspeed limit signal as a summation of said lateral wind speed signal and said right airspeed limit signal, and for providing a left groundspeed limit signal as a summation of said lateral wind speed signal and said left airspeed limit signal.

2. Speed command generating apparatus for a helicopter, comprising:

means providing a range to destination signal indicative of the distance to a destination to be reached by said helicopter;

means providing a true bearing to destination signal indicative of the bearing of the aircraft to the destination;

means providing a true heading signal indicative of the true heading of the aircraft; and means for providing a desired aircraft direction signal as the difference between said true bearing signal and said true heading signal, for providing a groundspeed command signal as a limited function of said range to destination signal, for providing a longitudinal groundspeed command signal in response to said limited groundspeed command signal times the cosine of said desired aircraft direction signal; and for providing a lateral groundspeed command signal in response to said limited groundspeed command signal times the sine of said desired aircraft direction signal.

3. Speed command generating apparatus for a helicopter, comprising:

means providing a range to destination signal indicative of the distance to a destination to be reached by said helicopter;

means providing a forward groundspeed limit signal indicative of a forward groundspeed limit for the helicopter; and means for providing a speed constant signal as a function of said forward groundspeed limit signal and for providing a groundspeed command signal as a limited function of the product of said speed constant signal and said range to destination signal.

4. Apparatus according to claim 3 wherein:

said last named means, in response to said range to destination signal indicating a predetermined short distance to the destination, providing said speed constant signal as a fixed speed constant instead of as a function of a forward speed limit.

5. A heading control apparatus for a helicopter having a yaw channel, comprising:

means for providing a heading input command signal indicative of a commanded heading for the aircraft; and means for providing a heading rate signal indicative of a desired yaw rate command as a function of the difference between said heading input command signal and the time integral of said heading rate signal, for providing a right limit exceeded signal indicative of a right lateral groundspeed command exceeding a limit, for providing a left limit exceeded signal indicative of a left lateral groundspeed command exceeding a limit, for providing a rate signal indicative of a fixed right yaw rate command in response to the presence of said right limit exceeded signal, for providing said rate signal indicative of a fixed left yaw rate command in response to the presence of said left limit exceeded signal, for providing a rate heading signal as the time integral of said rate signal, and for selectively either providing a yaw rate command to said yaw channel equal to said rate signal and a heading command signal to said yaw channel equal to said rate heading signal in response to either said right limit exceeded signal or said left limit exceeded signal, and for otherwise providing said yaw rate command signal to said yaw channel in response to said heading rate signal, and providing said heading command signal to said yaw channel in response to said command heading signal.

6. Apparatus according to claim 5 wherein said means for providing a heading input command signal alternatively provides a signal indicative of heading into the wind in hover or heading to a destination in cruise.

7. An automatic flight control for a helicopter, comprising:

means providing a true wind direction signal indicative of the direction of wind in the environment of the helicopter;

means providing a true heading signal indicative of the true heading of the helicopter;

means providing a wind speed signal indicative of the speed of the wind in the environment of the helicopter;

means providing a range to destination signal indicative of the distance to a destination to be reached by said helicopter;

means providing a true bearing to destination signal indicative of the bearing of the aircraft to the destination;

means providing a heading input command signal indicative of a commanded heading for the aircraft; and means for providing a relative wind direction signal as the difference between said true wind direction signal and said true heading signal, for providing a longitudinal wind speed signal as the wind speed signal multiplied by the cosine of said relative wind direction signal, for providing a lateral wind speed signal as the product of said wind speed signal and the sine of said relative wind direction signal, for providing a forward airspeed limit signal, an aft airspeed limit signal, a right airspeed limit signal, and a left airspeed limit signal, said limit signals being indicative of the airspeed safety envelope of the helicopter, for providing a forward groundspeed limit signal as a summation of said longitudinal wind speed signal and said forward airspeed limit signal, for providing an aft groundspeed limit signal as a summation of said longitudinal wind speed signal and said aft airspeed limit signal, for providing a right groundspeed limit signal as a summation of said lateral wind speed signal and said right airspeed limit signal, for providing a left groundspeed limit signal as a summation of said lateral wind speed signal and said left airspeed limit signal, for providing a desired aircraft direction signal as the difference between said true bearing signal and said true heading signal, for providing a speed constant signal as a function of said forward groundspeed limit signal, for providing a groundspeed command signal as a limited function of the product of said speed constant signal and said range to destination signal, for providing a longitudinal groundspeed command signal in response to said limited groundspeed command signal times the cosine of said desired aircraft direction signal, for providing a lateral groundspeed command signal in response to said limited groundspeed command signal times the sine of said desired aircraft direction signal, for providing a heading rate signal indicative of a desired yaw rate command as a function of the difference between said heading input command signal and the time integral of said heading rate signal, for providing a right limit exceeded signal indicative of a right lateral groundspeed command exceeding a limit, for providing a left limit exceeded signal indicative of a left lateral groundspeed command exceeding a limit, for providing a rate signal indicative of a fixed right yaw rate command in response to the presence of said right limit exceeded signal, for providing said rate signal indicative of a fixed left yaw rate command in response to the presence of said left limit exceeded signal, for providing a rate heading signal as the time integral of said rate signal, and for selectively either providing a yaw rate command to said yaw channel equal to said rate signal and a heading command signal to said yaw channel equal to said rate heading signal in response to either said right limit exceeded signal or said left limit exceeded signal, and for otherwise providing said yaw rate command signal to said yaw channel in response to said heading rate signal, and providing said heading command signal to said yaw channel in response to said command heading signal.

8. A method of providing a groundspeed envelope for a helicopter, comprising:

providing a true wind direction signal indicative of the direction of wind in the environment of the helicopter;

providing a true heading signal indicative of the true heading of the helicopter;

providing a wind speed signal indicative of the speed of the wind in the environment of the helicopter;

providing a relative wind direction signal as the difference between said true wind direction signal and said true heading signal;

providing a longitudinal wind speed signal as the wind speed signal multiplied by the cosine of said relative wind direction signal;

providing a lateral wind speed signal as the product of said wind speed signal and the sine of said relative wind direction signal;

providing a forward airspeed limit signal, an aft airspeed limit signal, a right airspeed limit signal, and a left airspeed limit signal, said limit signals being indicative of the airspeed safety envelope of the helicopter;

providing a forward groundspeed limit signal as a summation of said longitudinal wind speed signal and said forward airspeed limit signal;

providing an aft groundspeed limit signal as a summation of said longitudinal wind speed signal and said aft airspeed limit signal;

providing a right groundspeed limit signal as a summation of said lateral wind speed signal and said right airspeed limit signal; and providing a left groundspeed limit signal as a summation of said lateral wind speed signal and said left airspeed limit signal.

9. A method of generating speed commands for a helicopter, comprising:

providing a range to destination signal indicative of the distance to a destination to be reached by said helicopter;

providing a true bearing to destination signal indicative of the bearing of the aircraft to the destination;

providing a true heading signal indicative of the true heading of the aircraft;

providing a desired aircraft direction signal as the difference between said true bearing signal and said true heading signal;

providing a groundspeed command signal as a limited function of said range to destination signal;

providing a longitudinal groundspeed command signal in response to said limited groundspeed command signal times the cosine of said desired aircraft direction signal; and providing a lateral groundspeed command signal in response to said limited groundspeed command signal times the sine of said desired aircraft direction signal.

10. A method of controlling heading in a helicopter having a yaw channel, comprising:

providing a heading input command signal indicative of a commanded heading for the aircraft;

providing a heading rate signal indicative of a desired yaw rate command as a function of the difference between said heading input command signal and the time integral of said heading rate signal;

providing a right limit exceeded signal indicative of a right lateral groundspeed command exceeding a limit;

providing a left limit exceeded signal indicative of a left lateral groundspeed command exceeding a limit;

providing a rate signal indicative of a fixed right yaw rate command in response to the presence of said right limit exceeded signal;

providing said rate signal indicative of a fixed left yaw rate command in response to the presence of said left limit exceeded signal;

providing a rate heading signal as the time integral of said rate signal; and selectively either providing a yaw rate command to said yaw channel equal to said rate signal and a heading command signal to said yaw channel equal to said rate heading signal in the presence of either said right limit exceeded signal or said left limit exceeded signal, or otherwise providing said yaw rate command signal to said yaw channel in response to said heading rate signal, and providing said heading command signal to said yaw channel in response to said command heading signal.

11. A method of generating a speed command for a helicopter, comprising:

providing a range to destination signal indicative of the distance to a destination to be reached by said helicopter;

providing a forward groundspeed limit signal indicative of a forward groundspeed limit for the helicopter;

providing a speed constant signal as a function of said forward groundspeed limit signal; and providing a groundspeed command signal as a limited function of the product of said speed constant signal and said range to destination signal.

12. A method of controlling a helicopter, comprising:

providing a true wind direction signal indicative of the direction of wind in the environment of the helicopter;

providing a true heading signal indicative of the true heading of the helicopter;

providing a wind speed signal indicative of the speed of the wind in the environment of the helicopter;

providing a range to destination signal indicative of the distance to a destination to be reached by said helicopter;

providing a true bearing to destination signal indicative of the bearing of the aircraft to the destination;

providing a heading input command signal indicative of a commanded heading for the aircraft;

providing a relative wind direction signal as the difference between said true wind direction signal and said true heading signal;

providing a longitudinal wind speed signal as the wind speed signal multiplied by the cosine of said relative wind direction signal;

providing a lateral wind speed signal as the product of said wind speed signal and the sine of said relative wind direction signal;

providing a forward airspeed limit signal, an aft airspeed limit signal, a right airspeed limit signal, and a left airspeed limit signal indicative of the airspeed safety envelope of the helicopter;

providing a forward groundspeed limit signal as a summation of said longitudinal wind speed signal and said forward airspeed limit signal;

providing an aft groundspeed limit signal as a summation of said longitudinal wind speed signal and said aft airspeed limit signal;

providing a right groundspeed limit signal as a summation of said lateral wind speed signal and said right airspeed limit signal;

providing a left groundspeed limit signal as a summation of said lateral wind speed signal and said left airspeed limit signal;

providing a desired aircraft direction signal as the difference between said true bearing signal and said true heading signal;

providing a speed constant signal as a function of said forward groundspeed limit signal;

providing a groundspeed command signal as a limited function of the product of said speed constant signal and said range to destination signal;

providing a longitudinal groundspeed command signal in response to said limited groundspeed command signal times the cosine of said desired aircraft direction signal;

providing a lateral groundspeed command signal in response to said limited groundspeed command signal times the sine of said desired aircraft direction signal;

providing a heading rate signal indicative of a desired yaw rate command as a function of the difference between said heading input command signal and the time integral of said heading rate signal;

providing a right limit exceeded signal indicative of a right lateral groundspeed command exceeding a limit;

providing a left limit exceeded signal indicative of a left lateral groundspeed command exceeding a limit;

providing a rate signal indicative of a fixed right yaw rate command in response to the presence of said right limit exceeded signal;

providing said rate signal indicative of a fixed left yaw rate command in response to the presence of said left limit exceeded signal;

providing a rate heading signal as the time integral of said rate signal; and selectively either providing a yaw rate command to said yaw channel equal to said rate signal and a heading command signal to said yaw channel equal to said rate heading signal in response to either said right limit exceeded signal or said left limit exceeded signal, and otherwise providing said yaw rate command signal to said yaw channel in response to said heading rate signal, and providing said heading command signal to said yaw channel in response to said command heading signal.

* * * * *